United States Patent Office 3,181,611
Patented May 4, 1965

3,181,611
SELECTIVE PREVENTION OF WATER AND BRINE INTRUSION INTO MINERAL PRODUCING STRATA
Francis E. Dollarhide, Tulsa, Okla., assignor to The Dow Chemical Company, Midland, Mich., a corporation of Delaware
No Drawing. Filed June 29, 1961, Ser. No. 120,531
6 Claims. (Cl. 166—33)

The invention is concerned with an improved method of inhibiting or completely shutting off the intrusion of underground waters and brine into a mineral-bearing subterranean formation into which a borehole is drilled and is, therefore, concerned with the production of either fluid or solid minerals where intruding water presents a problem. The invention is particularly concerned with such method applied to the production of oil and gas and especially where it is desirable that the passage of water or brine be blocked off but the passage of oil or gas through the formation be permitted.

The passage of water or brine through the formation is of especial concern in the production of oil and/or gas. The existence of interconnecting pores, faults, and other channel-forming conditions has undesirable effects on both drilling and production operations. Among such undesirable effects is the loss of water or brine through the borehole wall from an aqueous drilling fluid when such type drilling fluid is employed. This loss is usually referred to as lost circulation. A different type of undesirable effect results when a gas, e.g., air, is employed as the drilling fluid and there is an encroachment of water into the borehole. Such encroachment is fraught with a number of attendant inconveniences and sometimes serious work stoppages result because the gas being employed as a drilling fluid cannot tolerate any appreciable percentage of moisture therein without the chips from the drill agglomerating and thereafter "balling up" and resisting being carried away from the bit and being impelled upwardly out of the well as desired. After the borehole has been completed and production therefrom undertaken, the encroachment of water or brine into the oil- or gas-producing formation gives rise to still further undesirable effects. Such inflow is undesirable for a number of reasons, among which are an increase in pumping and general operational costs; formation of an emulsion which is difficult to pump from the well and requires special treatment thereafter to break the emulsion before transfer or refining; inhibiting or preventing access of the oil or gas to the borehole in the formation by the encroaching water or brine, known as a water block.

Methods of sealing off the water zones from oil- or gas-producing zones have been suggested and attempted. Such attempts include the emplacement in the formation, either adjacent to the borehole or between water and oil- or gas-strata, of a substance which is impermeable to the passage of water. Some of such methods have achieved a degree of success. However, the problem has not been satisfactorily solved, largely because the substances so employed have usually sealed off oil- and gas-producing strata in a similar manner to the water-producing zones. Illustrative of materials emplaced in a formation to inhibit water intrusion are certain resinous materials among which are polyurethanes which set to a thermosetting resin in situ. Patents describing such polyurethanes are German Patent 1,089,344 and U.S. Patent 2,867,278. The methods of these patents are useful in certain type situations but are not satisfactory for selectively plugging off water intrusion without concomitantly plugging off oil flow. A satisfactory method for sealing off water or brine should be selective in its action. Attempts to provide such method have heretofore not been fully successful and a need therefor continues.

The present invention is a method which seals off water zones in subterranean formations but does not seal off the oil- or gas-bearing zones and is, accordingly, selective and, therefore unique, in well-treating operations.

The invention, therefore, is a method of sealing off water or brine zones without also sealing off oil- or gas-bearing zones in a subterranean formation, thereby inhibiting or preventing the intrusion of water or brine into the oil- or gas-bearing zones, consisting essentially of (1) emplacing in the water zone, or at the periphery or outer edges of the oil- or gas-producing zones in the formation which are in contact with water or brine, a composition prepared by admixing (a) a reactive polyurethane prepolymer prepared by admixing a compound containing polyfunctional hydroxyl groups and a compound having polyfunctional isocyanate groups in a ratio such that there is a molar excess of isocyanate groups over the reactive hydroxyl groups to insure the presence of unreacted isocyanate groups, (b) a monofunctional compound having one reactive hydrogen atom per molecule in an amount at least sufficient to provide the stoichiometric equivalent of the unreacted isocyanate groups remaining in the prepolymer, if such groups were to react entirely with the monofunctional hydrogen compound, and (c) a base-type catalyst; (2) allowing those portions of the composition, thus emplaced, which are in contact with water, to set to form water-impermeable solid resin barriers; and (3) removing from the well substantially all the remaining composition which had not come in contact with water. An organic carrier liquid substantially chemically inert to the composition thus being injected may advantageously be employed to facilitate injection of the composition into the formation.

Prepolymer polyurethane mixtures are known. They are sometimes referred to as partially polymerized polyurethanes. They may be polyethers thereof such as would be produced by reacting a polyol with a diisocyanate or they may be a polyester thereof such as would be produced by first reacting a dicarboxylic acid and a polyol and then reacting the ester so formed with a diisocyanate.

The compounds containing polyfunctional hydroxyl groups employed in the prepolymer mixture are the diols and triols, e.g., glycols and glycerol, and the reaction products of such diols or triols with propylene oxide or ethylene oxide. Propylene oxide triol may be illustrated by the formula:

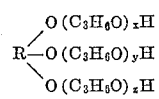

wherein R is the trivalent group —CH$_2$CHCH$_2$— and $x$, $y$, and $z$ are of such value as to give a molecular weight of from about 350 to about 1400. The term "propylene oxide triol," when used hereinafter, refers to one having the above generic formula.

The diisocyanates employed to make the prepolymer mixture used in the practice of the invention are any of those known to be satisfactory for the production of urethane-type resins. Those most commonly employed are tolylene diisocyanate; diphenylmethane-4,4'-diisocyanate; 3,3' - dimethyldiphenylmethane-4,4'-diisocyanate; naphthalene-1,5-diisocyanate; and α,w-hexamethylenediisocyanate.

Illustrative of monofunctional hydrogen-containing compounds for use in the invention are the aliphatic monohydroxy alcohols having from 1 to 8 carbon atoms, inclusive, (including both the straight chain and branched isomers), phenols, and weakly ionized monocarboxylic acids.

The catalyst employed in the practice of the invention is selected from those commonly employed in the production of polyurethane-type resins. Illustrative of such catalysts are N-methylmorpholine; dimethylethanolamine; triethylamine; N,N'-diethylcyclohexylamine; tri-n-propylamine, N-ethylmorpholine, N,N,N',N'-tetramethyl-1,3-butanediamine, and 2,4,6-tri(dimethylaminomethyl)phenol.

The organic carrier liquid is employed largely as a diluent or extender and to impart greater fluidity to the composition. It is preferable to employ such carrier liquid but not essential. The organic carrier liquid employed must be substantially non-polar and inert to the prepolymer, to the monofunctional hydrogen-containing compound, and to the catalyst. Illustrative of such organic liquids are xylene, dichloroethylene, carbon tetrachloride, and petroleum fractions such as heptane. There should be no water present in the organic solvent.

The effectiveness of the invention appears to be due largely to the fact that excess isocyanate groups present in the prepolymer composition react promptly with water when in contact therewith to form a substanially fluid-impermeable solid resin. The presence of the monofunctional compound containing reactive hydrogen atoms, e.g., a mono-alcohol, employed in accordance with the invention, does not noticeably affect this impermeable resin-forming reaction, due apparently to the preference of the isocyanate groups for the water, until about 8 hours or more have passed. However, if no monofunctional compound containing reactive hydrogen atoms is present, as is required to be in accordance wtih the invention, the unreacted isocyanate groups, in the presence of a catalyst, react with some reactant within the composition itself (possibly with hydrogen atoms available in the urethane linkages in the composition) to form, in the absence of water although more slowly, a substantially fluid-impermeable resin similar to that formed with water. (This is undesirable because oil-producing sections of the formation are thereby sealed off.) However, when a monofunctional compound containing reactive hydrogen atoms, e.g., a $C_1$ to $C_8$ mono-alcohol, is present, and if no water is contacted within about 8 hours or more, the unreacted isocyanate groups react with the reactive hydrogen atoms in the prepolymer to form an adduct which results in the prepolymer retaining its flowable or pumpable characteristics.

In the practice of the invention, such pumpable adduct, as above described, or unreacted prepolymer, is subsequently substantially all removed from the well as a fluid, but those portions of the prepolymer which have come into contact with water before such adduct was fully formed is left in the formation as a fluid-impermeable resin to plug or seal off the water-containing portions thereof. The oil-or gas-bearing portions of the formation are thereby rendered free of a settable resin and hence fluid-permeable. It is not necessary in the practice of the invention to remove all of the pumpable or unset resin since it does not form a solid resin in the formation unless it contact water within about 8 hours.

The ratio of the diisocyanate to the polyol employed to make the polyurethane prepolymer may be varied so long as there is sufficient diisocyanate employed to provide an excess of isocyanate groups to hydroxyl groups and yet not require an excessive quantity of the monofunctional reactive hydrogen-containing compound to be subsequently admixed therewith. However, when only a bare excess of the isocyanate groups are provided in the prepolymer and it is subsequently admixed wtih substantially the stoichiometric equivalent of the monofunctional reactive hydrogen-containing compound and thereafter brought into contact with water in a subterranean formation in accordance with the practice of the invention, the resulting resin tends to form the desired cross-linked thermoset resin more slowly than is desired. On the other hand, it is not advisable to provide a large excess of the isocyanate groups since an excessive quantity of the monofunctional reactive hydrogen-containing compound must then be subsequently employed to provide the stoichiometric quantity thereof. The use of an excessive quantity of such monofunctional compound is uneconomical. For convenience, when the prepolymer is being prepared, the excess of isocyanate groups is usually calculated as a percent by weight of the total prepolymer composition. The percent thus calculated is usually between about 5 and 20 percent of the prepolymer weight.

Suitable polyurethane prepolymers for use in the practice of the invention may be made especially or they may be procured from the commercial producers thereof under the general heading of "urethane prepolymers." Among such prepolymers commercially available are the following: (1) that prepared by reacting tolylene diisocyanate and a 50:50 mole ratio mixture of 750 molecular weight ethylene oxide diol and propylene oxide diol in a weight ratio of 5.33 parts of the diisocyanate of 14 parts of the diol mixture; (2) that prepared by reacting tolylene diisocyanate and a 700 molecular weight propylene oxide triol (the reaction product of glycerol and propylene oxide) in a weight ratio of 8.5 parts of the diisocyanate to 13.5 parts of the triol; and (3) that prepared by reacting tolylene diisocyanate, castor oil, and a 200 molecular weight polyoxyethylene glycol. The prepolymers (1), (2), and (3), listed above, are available under the following designations: (1) as No. 1562–28 and (2) as No. 1580–28 from The Dow Chemical Company and (3) as RCD–2071 from E. I. du Pont de Nemours and Company.

Although, as aforesaid, the recommended amount of the monofunctional reactive hydrogen-containing compound, e.g., a lower alkyl mono-alcohol, to employ is the stoichiometric equivalent thereof for reacting with the excess isocyanate groups, an excess thereover may be employed. A slight excess is often employed as a convenient insurance of the presence of at least the stoichiometric quantity. However, an appreciable excess is not only uneconomical, but the treating composition so formed tends to be less effective as a water-plugging agent. It has been found that the molar ratio of the monofunctional reactive hydrogen-containing compound employed should be less than about 10 and preferably less than about 8.4 per isocyanate group.

To illustrate the amount of the specific monofunctional hydrogen-containing compound to employ when the percent of excess isocyanate groups present in a given weight of a specific polyurethane prepolymer is known, the following calculations are set forth for a prepolymer prepared by reacting 8.5 pounds of tolylene diisocyanate and 13.5 pounds of propylene oxide triol (having the generic formula set forth hereinbefore and an average molecular weight of 700) and containing an excess of isocyanate groups of 8.4 percent, based on the prepolymer weight, to which isopropyl alcohol is subsequently admixed for use in the invention:

The molecular weight of isopropyl alcohol is 60. Therefore, a pound mole (60 pounds) thereof contains 1 hydroxyl group and hence 1 pound of reactive hydrogen. A pound mole of isocyanate groups is 42 pounds and is equivalent to a pound mole of reactive hydrogen, or $\frac{1}{42}$ pound of hydrogen is equivalent to 1 pound of the isocyanate groups. The following proportion shows the weight of isopropyl alcohol necessary to provide an equivalent weight thereof for 1 pound of excess isocyanate groups:

$$42:60::1:x \text{ or } x=1.43 \text{ pounds,}$$

the minimum weight of isopropyl alcohol necessary per pound of excess isocyanate groups. Since the percent of excess isocyanate groups for a given weight of prepolymer is either provided by the supplier or can be readily determined by analysis, such percent (8.4 percent in the instant illustration) multiplied by the weight of prepolymer used gives the weight of excess isocyanate groups present. Since about 10 moles and preferably about 8.4 moles of reactive hydrogen atoms per mole of excess isocyanate groups are the maximum to be employed, then not more than about 600 pounds and preferably not more than about 270 pounds of isopropyl alcohol per 42 pounds of excess isocyanate groups in the prepolymer are used.

To show the effectiveness of the practice of the invention, some compositions were prepared in accordance with the invention and others in accordance with conventional practice. Both types of compositions were employed in a series of tests wherein sandstone cores, both in the absence and in the presence of water, were treated.

The tests of this series were conducted as follows: Four Berea sandstone cores, 4 inches long and 3¼ inches in diameter and having a known permeability of between 50 and 100 millidarcies, were prepared. They are hereinafter identified as Cores A, 1, B, and 2. Cores A and 1 were saturated with kerosene. Cores B and 2 were saturated with water. Four 62.5-milliliter portions of a polyurethane prepolymer mixture consisting of tolylene diisocyanate, castor oil, and a polyoxyethylene glycol having a molecular weight of 200 and containing an excess of the isocyanate groups over the hydroxyl groups provided by the glycol of 11 percent, were admixed with 9.4 milliliters of 2,4,6-tri(dimethylaminomethyl)phenol as a catalyst and 187.5 milliliters of xylene as an organic carrier liquid at 80° F. Two portions of mixture thus prepared were employed with Cores A and B in Comparative Runs A and B which are not illustrative of the invention. To two of the four portions of the polyurethane mixture were admixed 12.5 milliliters of isopropyl alcohol and the resulting compositions employed with Cores 1 and 2, to comprise Examples 1 and 2, set forth hereinafter as illustrative of the practice of the invention.

The Berea sandstone cores, prepared as above described, were successively placed in a suitable cylindrically shaped holder. In individual successive tests, the holder was positioned vertically and each of the liquid compositions so prepared, either in accordance with the invention (wherein the isopropyl alcohol was present) or the composition for comparative purposes (wherein no isopropyl alcohol was present) was poured into the cylindrically shaped holder just above the sandstone core and thereby caused to percolate downwardly through each of the water- or kerosene-saturated sandstone cores until some of the composition began to exude from the bottom of the cores. No more liquid composition was then added. The cores so treated were allowed to stand for the periods of time set out in the table below. Pressures, in the number of pounds per square inch set out in the table below, were then applied to the bottom of each of the cores contained in the holder to effect a reverse flow from the top of the sandstone cores. The effect of the back pressures on the resin-impregnated sandstone cores is also shown in the table.

*Table*

| Test designation | Impregnating fluid | Treating composition | Time allowed for resin to set, hours | Back pressure applied in p.s.i.g. | Effect of pressure on resin |
|---|---|---|---|---|---|
| Comparative Run A (employing Core A) | Kerosene | Polyurethane prepolymer only. | 4-5 | 1,200 | Resin had solidified—no flow. |
| Example 1 (employing Core 1) | do | Polyurethane prepolymer plus isopropyl alcohol. | 16 | 100 | Resin remained fluid—exuded readily. |
| Comparative Run B (employing Core B) | Water | Polyurethane prepolymer only. | 4-5 | 1,200 | Resin had solidified—no flow. |
| Example 2 (employing Core 2) | do | Polyurethane prepolymer plus isopropyl alcohol. | 16 | 1,200 | Do. |

Reference to Example 1 of the table shows that kerosene-treated sandstone cores remained permeable to fluids when impregnated with the composition employed in accordance with the invention. Reference to comparative Run A, on the other hannd, shows that the kerosene-treated sandstone cores became impermeable to the passage of fluids therethrough even when subjected to 1200 p.s.i.g. of pressure when treated with a comparable resin composition but which did not contain the monofunctional alcohol. Reference to Example 2 and Comparative Run B of the table shows that the water-treated sandstone cores became impermeable to the passage of fluids therethrough when subjected to 1200 p.s.i.g. of pressure both when impregnated with a composition employed in accordance with the invention and when impregnated with comparable resins but which did not contain the monofunctional alcohol. In other words, Example 2 and comparative Run B show that the polyurethane containing the polyfunctional alcohol is as effective to seal off water flow as the same polyurethane without the monofunctional alcohol.

The practice of the invention was then further illustrated by a second series of tests demonstrating the effect of water on the polyurethane prepolymer composition placed in glass containers in the absence of a sandstone or other core, thereby to permit observation of the behavior of the resin with and without the addition of the alcohol both in the presence of water and in the absence thereof. The second series of tests was carried out by admixing 12 grams of a polyurethane prepolymer consisting of the reaction product of 8.5 parts of tolylene diisocyanate and 13.5 parts by weight of propylene oxide triol, having the generic formula set out hereinbefore and an average molecular weight of 700. There was thus provided an excess of 8.4 percent isocyanate groups based on the weight of the prepolymer. 1.5 milliliters of a suitable catalyst, as hereinbelow described, and 50 milliliters of xylene were then admixed therewith. The composition so made was divided into six portions. One was not further treated. To the other four, isopropyl alcohol was added in increasing amounts (as explained below) to show the effect of the presence thereof on the resin when contacted with water. Thereafter, 10 milliliters of water were added without appreciable delay to each composition so prepared. In each of the tests, both in accordance with the invention and for purposes of comparison, the prepolymers set up to a hard solid in about 0.5 hour after the water was added.

The catalysts employed above were the following: triethylamine, tri - n - propylamine, N - ethylmorpholine, N,N,N',N'-tetramethyl - 1,3 - butanediamine and 2,4,6-tri(dimethylaminomethyl)phenol. Each of the catalysts appeared to work in substantially the same effective manner.

Isopropyl alcohol was added in the second series of tests in amounts of 1, 2, 3, 4, and 5 milliliters. Permeability tests showed no difference in the set of the polymer formed upon contact with water in any one of the tests, including that wherein no isopropyl alcohol was present. It is, therefore, clear that the presence of the isopropyl alcohol does not noticeably affect the setting of the polymer upon contact with water within the time allowed in the tests.

A third series of tests was run similarly to those of the second series above wherein isopropyl alcohol additions were varied by increments of 1 milliliter from none to 5 milliliters. In this series of tests, however, no water was added until after 8 hours had passed whereupon 10 milliliters of water were added thereto. Permeability tests showed the following results: after 8 hours those tests wherein either no isopropyl alcohol or only 1 milliliter of isopropyl alcohol was used, the polymer had set to a hard, non-fluid, water-impermeable resin within a half hour after contact with the water. It can be observed that 1 milliliter of the isopropyl alcohol (sp. gr. of about 0.87) is definitely less than the 1.43 grams per gram of isocyanate groups required in the practice of the invention, whereas 2 milliliters of the alcohol provides 1.74 grams thereof which is satisfactory. In those tests wherein from 2 to 5 milliliters of alcohol were used, the resin continued to remain pourable and fluid although contacted with water after a period of 8 hours. This series of tests shows that the presence of the isopropyl alcohol deactivates or precludes the subsequent reaction of the polymer with water after an appreciable length of time has elapsed (in this instance 8 hours) between the time of addition of the alcohol and the time of contact of the so treated resin composition with water.

Some of the tests of this series were repeated employing 12 and 15 milliliters of isopropyl alcohol per 10 milliliters of the prepolymer. The tests employing 12 milliliters (about 10 grams) of the alcohol were satisfactory but those employing 15 milliliters (about 12.75 grams) were unsatisfactory, the resin not forming a completely fluid-impermeable resin upon addition of 10 milliliters of water. It will be observed that 12 milliliters or about 10 grams of the alcohol per 12 grams of prepolymer (containing about 1 gram of isocyanate groups) represents about 8.4 moles of the alcohol per isocyanate group and that 15 milliliters of the alcohol represents about 10 moles of the alcohol per isocyanate group. This shows that a molar ratio of the monofunctional hydrogen compound to the isocyanate groups of about 10 or more is not generally acceptable.

A fourth series of tests was run, similar to those of the third series above, except that no isopropyl alcohol or water was added to the prepolymer. After 24 hours the resin had set up to a non-pourable, water-impermeable solid. This series of tests points up the significance of the presence of the monofunctional alcohol for, in its absence, the polymer sets up to an impermeable mass in the absence of water and, consequently when injected in the fluid state into a formation, would set and block off the oil flow to the well. These tests were repeated except that from 2 to 5 milliliters of isopropyl alcohol were admixed with the polymer composition in each test. The results were again examined after 24 hours. The polymer was still permeable and had not set up. This series shows that the polymer when not containing the monohydroxy alcohol nor contacted with water sets up, although somewhat more slowly than when contacted with water, to a solid resin.

A review of the results of the tests set forth above shows the following facts in relation to the practice of the invention: untreated polyurethane prepolymers, as described herein, when subsequently contacted with water, result in a hard set resin within about 0.5 hour. The same type of prepolymer, when admixed with isopropyl alcohol in accordance with the practice of the invention, and then contacted with water within about 8 hours results also in a hard set resin. When such resin composition containing the isopropyl alcohol is not contacted with water before about 8 hours has elapsed, it remains fluid and appears to have been de-activated against reacting with the water to form the hard set resin. The results of the tests also show that the polyurethane prepolymer, when not containing the alcohol or other monofunctional reactive hydrogen-yielding compound, even though remaining out of contact with water, sets to a hard resin within about 24 hours. It is clear, therefore, from a study of the results, that the presence of such monofunctional reactive hydrogen-containing compound as isopropyl alcohol prevents the polymer from setting up, as it otherwise would, by continued polymerization within itself, thereby permitting strata, which are substantially free from water, e.g., oil and gas strata, to retain their permeability, but on the other hand, does not interfere with further polymerization of the composition when brought in contact with water.

The following example is illustrative of field practice of the invention: an oil well having a bottom hole temperature of 150° F., plagued with the production of water along with the oil, requires treatment. The water zone lies immediately below the oil zone. It is therefore desired that the water be shut off without decreasing the permeability of the oil zone or lessening the oil production. From past experience it is known that injecting a known settable resin composition for this purpose into the zone will plug off at least a portion of the oil-producing zone and thereby be accompanied by undesirable results. The well is treated in accordance with the invention as follows: 250 gallons of a polyurethane prepolymer composition is prepared by admixing 966 pounds of tolylene diisocyanate and 1,534 pounds of propylene oxide triol, as hereinabove defined and having a molecular weight of 700. The resulting mixture is admixed with 750 gallons of xylene. Thereafter the composition thus made is admixed with 50 gallons of isopropyl alcohol containing 37.5 gallons of 2,4,6-tri(dimethylaminomethyl) phenol as a catalyst.

A study of the proportion of reactants herein used indicates that 966 pounds of tolylene diisocyanate represent about 5.55 pound moles thereof and 1,534 pounds of the propylene oxide triol, having a molecular weight of 700, represents about 2.2 pound moles of hydroxyl groups. Since the tolylene diisocyanate is difunctional and the propylene oxide triol is trifunctional, 5.55 pound moles of the tolylene diisocyanate would provide about 11.1 equivalents of isocyanate groups and the propylene oxide triol would provide about 6.6 equivalents of hydroxyl groups. Since the weight of isopropyl alcohol is about 6.5 pounds per gallon, 50 gallons thereof would weigh about 325 pounds which is 5.3 pound moles of isopropyl alcohol. It follows, therefore, that the total mole equivalents of the propylene oxide triol (6.6) and the isopropyl alcohol (5.3) provides an excess thereof over the 11.1 mole equivalents of the tolylene diisocyanate. Reactive hydrogen to react with the unreacted diisocyanate groups in the prepolymer, therefore, are fully provided for by the isopropyl alcohol.

1,026 gallons of the composition thus made is pumped down the well and squeezed back into the water-producing zone of the formation. The well is then shut in preferably for at least 4 hours to allow the polyurethane composition containing the isopropyl alcohol, now in contact with the water, to react therewith and set. After the closed-in period, substantially all the composition therein which has not contacted and accordingly not reacted with water, and, therefore, still in a fluid state, is pumped out of the well. Any polymer, however, not removed from the formation will not form fluid-impermeable resins either by the reaction between the unreacted isocyanate groups and the monofunctional alcohol or after more than about 8 hours, by reaction with water with which it comes in contact.

There is thus provided a water-impermeable seal in the water zone or in the water-wetted portion of the formation intermediate the water zone and the oil-producing zone. This is accomplished without impairment of the permeability of the oil-producing zone.

The invention having been described, what is claimed and desired to be protected by Letters Patent is:

1. The method of sealing off water and brine zones to inhibit intrusion of water and brine therefrom into a mineral-producing zone in a subterranean formation penetrated by a borehole which consists of admixing: (a) a liquid polyurethane prepolymer prepared by reacting a compound having hydroxyl polyfunctionality with a compound having isocyanate polyfunctionality in amounts of each to provide an excess of isocyanate groups over the stoichiometric quantity required to react with the hydroxyl groups, of between about 5 and 20% by weight of the prepolymer, (b) a base catalyst, and (c) a monofunctional reactive hydrogen-containing compound, selected from the class consisting of aliphatic branched and straight chain monohydroxy alcohols having from 1 to 8 carbon atoms per molecule, phenol, and weakly ionized monocarboxylic acids, in an amount sufficient to provide at least the stoichiometric equivalent of reactive hydrogen atoms necessary to react with substantially all the unreacted isocyanate groups in the prepolymer, if the isocyanate groups were to react entirely with the monofunctional reactive hydrogen-containing compound; forcing the composition thus prepared down the borehole and back into the formation and into contact with water therein; closing in the well for a time sufficient for the water to react with the composition and produce, in the formation where contact with water is thus made, a substantially fluid-impermeable resin seal; and thereafter pumping from the well and formation at least a portion of the composition which has not been brought into contact with water and therefore has remained in a fluid state.

2. The method of claim 1 wherein the monofunctional reactive hydrogen-containing compound provides between about 1 and about 10 reactive hydrogen atoms per isocyanate group present in the prepolymer.

3. The method of claim 1 wherein the compound containing monofunctional hydrogen atoms is an aliphatic monohydroxy alcohol containing between 1 and about 8 carbon atoms.

4. The method of claim 3 wherein the alcohol is isopropyl alcohol.

5. The method according to claim 1 wherein the composition thus made is diluted with a substantially non-polar organic carrier liquid unreactive with said composition.

6. The method according to claim 5 wherein the substantially non-polar organic liquid is selected from the class consisting of non-polar aromatic and aliphatic hydrocarbon liquids.

References Cited by the Examiner
UNITED STATES PATENTS

| | | | |
|---|---|---|---|
| 2,366,036 | 12/44 | Leverett et al. | 166—33 |
| 2,867,278 | 1/59 | Mallory et al. | 166—33 |
| 2,889,883 | 6/59 | Santora | 166—33 |

CHARLES E. O'CONNELL, *Primary Examiner.*